United States Patent
Beier et al.

(10) Patent No.: US 12,497,563 B2
(45) Date of Patent: Dec. 16, 2025

(54) SYSTEM AND METHOD FOR PRODUCING AN INJECTION SILICATE GEL SOLUTION FOR INJECTION INTO A SOIL

(71) Applicant: BAUER Spezialtiefbau GmbH, Schrobenhausen (DE)

(72) Inventors: Dirk Beier, Chemnitz (DE); Karsten Beckhaus, Munich (DE); Lars Liersch, Schrobenhausen (DE); Patrik Wenzl, Stadtbergen (DE)

(73) Assignee: BAUER Spezialtiefbau GmbH, Schrobenhausen (DE)

( * ) Notice: Subject to any disclaimer, the term of this patent is extended or adjusted under 35 U.S.C. 154(b) by 139 days.

(21) Appl. No.: 18/264,333

(22) PCT Filed: Mar. 11, 2022

(86) PCT No.: PCT/EP2022/056342
§ 371 (c)(1),
(2) Date: Aug. 4, 2023

(87) PCT Pub. No.: WO2022/194704
PCT Pub. Date: Sep. 22, 2022

(65) Prior Publication Data
US 2024/0124778 A1 Apr. 18, 2024

(30) Foreign Application Priority Data
Mar. 18, 2021 (EP) ..................... 21163394

(51) Int. Cl.
*C09K 17/12* (2006.01)
(52) U.S. Cl.
CPC .................... *C09K 17/12* (2013.01)

(58) Field of Classification Search
CPC ........ B09C 1/08; B09C 2101/00; C09K 17/12
See application file for complete search history.

(56) References Cited

U.S. PATENT DOCUMENTS

| 2,968,572 A | * | 1/1961 | Peeler, Jr. | ................ | C11D 3/08 |
| | | | | | 106/287.18 |
| 3,371,712 A | * | 3/1968 | Adams | ................... | C09K 17/48 |
| | | | | | 106/634 |

(Continued)

FOREIGN PATENT DOCUMENTS

| DE | 4409605 A1 | * | 11/1995 | ............. | B09C 1/025 |
| DE | 102 18 771 A1 | | 11/2002 | | |

(Continued)

OTHER PUBLICATIONS

Machine Translation, De 10218771A1; All Nov. 2002 (Year: 2002).*

(Continued)

*Primary Examiner* — Benjamin F Fiorello
(74) *Attorney, Agent, or Firm* — Studebaker Brackett PLLC

(57) ABSTRACT

The invention relates to a system for producing an injection silicate gel solution for injection into a soil, comprising a filtering device through which a mixing water can flow for pretreatment, wherein the filtering device comprises at least one filter element for ion exchange, an admixing device for metered admixing of a curing agent, a feeding device for feeding liquid silica sol into the pretreated mixing water, a feeding device for feeding liquid sodium silicate into the pretreated mixing water, and a mixing device for mixing and homogenizing the fed components with the pretreated mixing water for forming an injection silicate gel solution.

11 Claims, 1 Drawing Sheet

(56) References Cited

U.S. PATENT DOCUMENTS

| | | | | | |
|---|---|---|---|---|---|
| 3,626,699 | A | * | 12/1971 | Lees | C09K 17/12 |
| | | | | | 405/263 |
| 4,973,196 | A | * | 11/1990 | Fuhr | E02D 31/004 |
| | | | | | 405/129.7 |
| 5,302,287 | A | * | 4/1994 | Losack | B09C 1/02 |
| | | | | | 210/612 |
| 5,368,411 | A | * | 11/1994 | Losack | B09C 1/10 |
| | | | | | 134/40 |
| 5,370,478 | A | * | 12/1994 | Bartlett | E02D 3/12 |
| | | | | | 588/256 |
| 5,795,104 | A | * | 8/1998 | Schanze | C04B 40/0658 |
| | | | | | 106/900 |
| 2003/0103814 | A1 | * | 6/2003 | Greenwood | C09K 17/12 |
| | | | | | 405/263 |
| 2010/0215556 | A1 | * | 8/2010 | Domszy | B01J 41/10 |
| | | | | | 423/100 |

FOREIGN PATENT DOCUMENTS

| | | |
|---|---|---|
| EP | 2 787 123 B1 | 8/2015 |
| JP | H10-036840 A | 2/1998 |
| WO | 2019/121873 A1 | 6/2019 |

OTHER PUBLICATIONS

International Preliminary Report on Patentability and Written Opinion issued in PCT/EP2022/056342; issued Sep. 12, 2023.
International Search Report issued in PCT/EP2022/056342; mailed Jul. 6, 2022.

* cited by examiner

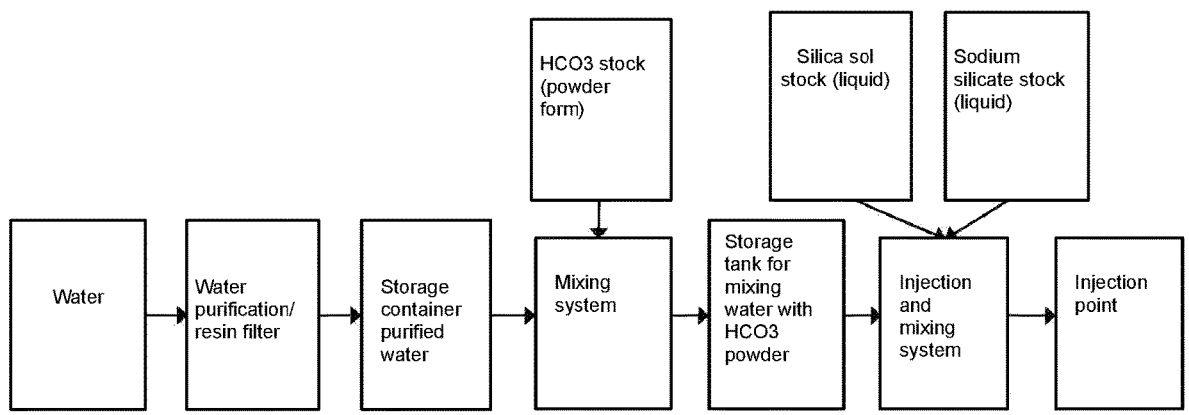

SYSTEM AND METHOD FOR PRODUCING AN INJECTION SILICATE GEL SOLUTION FOR INJECTION INTO A SOIL

The invention relates to a system for producing an injection silicate gel solution for injection into a soil according to claim 1.

Furthermore, the invention relates to a method for producing an injection silicate gel solution according to claim 7.

For excavation pits whose bottoms are below a groundwater level, an excavation pit enclosure is generally required. The purpose of the excavation pit enclosure is to prevent groundwater from entering the excavation pit. To create the excavation pit enclosure, a vertical, sealed perimeter wall is constructed up to a water-blocking soil layer in the ground. In the event that there is no natural, horizontally running, water-blocking soil layer, a substantially horizontally running sealing blanket must be created for the excavation pit enclosure. To produce such a sealing blanket, it is known from DE 102 18 771 A1 that a soft gel is injected into the soil. At the time of injection, the soft gel may still have a low viscosity and be flowable or liquid. In this method, the use of a liquid silica sol without any use of sodium silicate as injection medium is suggested.

By pumping-in the injection medium, a spherical or disc-shaped injection body is created around an injection point, in which liquid is displaced between solid soil particles by the injection medium. Due to the existing or forming gel-like structure of the injection medium, the thus formed injection bodies have a water-blocking sealing property. By stringing together a large number of such injection bodies, a water-blocking layer and thus a sealing blanket can be formed in a soil layer.

It is known from EP 2 787 123 B1 that tap water, to which a complexing agent is added, is used as mixing water for the production of a soft gel injection solution. The complexing agent binds metal ions in the mixing water, so that improved properties of the soft gel injection in terms of viscosity and flow properties can be achieved when mixing with a sealing primary material. Silica sol or sodium silicate can be used as a sealing primary material for mixing with the mixing water.

Another injection solution is known from WO 2019/121873 A1, which also dispenses with the use of sodium silicate. The method proposed here makes it possible to dispense with an active mixing device for mixing the individual components, since the use of carbon dioxide, as a gaseous reactive, automatically leads to uniform mixing of the components.

Finally, JP H10-036840 A, discloses indications of the composition of a possible solution for injection. However, this prior art does not contain any indications as to how a mixture of the components could take place.

The object underlying the invention is to provide a system and a method for producing an injection silicate gel solution, with which an injection silicate gel solution with good injection properties can be produced in a particularly efficient manner.

The object is achieved on the one hand by a system having the features of claim 1 and on the other hand by a method having the features of claim 7. Preferred embodiments of the invention are indicated in the respective dependent claims.

According to the invention, a system for producing an injection silicate gel solution for injection into a soil is provided, comprising a filtering device through which a mixing water can flow for pretreatment, wherein filtering device comprises at least one filter element for ion exchange, in particular a resin filter, an admixing device for metered admixing of a curing agent, in particular a hydrogen carbonate powder, a feeding device for feeding liquid silica sol into the pretreated mixing water, a feeding device for feeding liquid sodium silicate into the pretreated mixing water, and a mixing device for mixing and homogenizing the fed components with the pretreated mixing water for forming an injection silicate gel solution.

A first aspect of the invention is to pre-treat the mixing water by passing it through a filtering device. In this regard, the filtering device comprises at least one filter element for ion exchange. This possibly eliminates the need to add a chemical substance, such as a complexing agent, to the mixing water. Metal ions in the mixing water can attach directly to an ion exchange resin, for example, and be retained there. This pretreatment of the mixing water is efficient and cost-effective.

Another aspect of the invention is that a curing agent, e.g. hydrogen carbonate, in powder form, as well as silica sol and sodium silicate in the liquid state are subsequently added to the mixing water pretreated in this way. In this way, it can be achieved that a particularly good mixture with solution of the curing agent, e.g. hydrogen carbonate in powder form, is obtained without excessive input of mixing energy. This is energy efficient and supports controlled gel formation. This enables particularly good dosability and injectability of the silicate gel solution. Subsequently, the silicate gel solution produced in this way can be injected into the soil. he silicate gel solution may already have a certain gel-like structure when injected, or it may form this structure only when injected into the soil layer. Gel formation then takes place, which results in sealing. This then forms a silicate gel body together with the soil.

A preferred further development of the system according to the invention is that it is line-connected to an injection device with which the injection silicate gel solution produced can be injected into the soil for forming a silicate gel blanket. The injection device can be for this purpose, in particular, a pumping device which is line-connected to an injection lance, for example of a drilling apparatus. The injection lance can be formed on a drill pipes, with which the injection medium is introduced into the soil into an intended soil layer at a predetermined pressure, which is preferably between 3 bar to 30 bar.

According to a further embodiment of the invention, it is advantageous that the filter element comprises an ion exchange resin, in particular a cation exchange resin and/or an anion exchange resin. This enables both negative and positive metal ions to be reliably removed from the mixing water. In particular, a desired water hardness of the mixing water can also be set in this way. This can preferably be a degree of hardness below 3, preferably 0, or in the range close to 0. In this way, a particularly uniform and defined gelling behavior of the adjusted mixture and thus a particularly uniform sealing effect of the injection gel can be achieved.

According to a further development of the invention, a particularly good pretreatment of the mixing water can be achieved in that the filtering device comprises at least one first filter element with a cation exchange resin and at least one second filter element with an anion exchange resin. The filtering device can also be used to purify the water with removal of coarse particles and turbing substances.

It is particularly advantageous that several first filter elements and several second filter elements are arranged alternately to one another in the direction of flow. In this way, a wide variety of metal ions can be removed from the mixing water with particular reliability. Even if the composition of the tap water varies, a silicate gel medium of largely constant quality can be achieved in this way.

A further advantageous embodiment of the system according to the invention is that the filtering device has a backwashing device for regenerating the at least one filter element. By regular backwashing of the filter element or the individual filter elements, the adsorbed metal ions can be removed again from the exchange resin and flushed off. In this process, the effect of reverse osmosis is applied to the filter elements. Since the metal ions are removed from the normal tap water, they can be discharged as normal wastewater or put to another use without further ado.

A further advantageous embodiment of the invention is that the injection device is part of a drilling rig. In particular, the injection device can be arranged on a drilling rig or close to a drilling rig for earth drilling, so that a soft gel can be created and processed immediately in a particularly efficient manner. This saves energy, time and transport costs when creating a sealing blanket in the ground for an excavation pit enclosure.

According to the invention, there is further provided a method for producing an injection silicate gel solution, in particular with one of the systems described above, wherein mixing water is passed through a filtering device with at least one filter element for ion exchange, wherein the mixing water is pretreated, a curing agent, in particular a hydrogen carbonate powder, is added to the pretreated mixing water, liquid silica sol and liquid sodium silicate are then fed to the pretreated mixing water, and the mixing water is mixed with the fed components and homogenized, wherein the injection silicate gel solution is formed.

The method, in particular, can be carried out with one of the systems described above. The advantages described above can be achieved.

In principle, the components, i.e. the silica sol and sodium silicate, can be fed in different mixing ratios. A particularly advantageous embodiment of the invention with regard to gel formation and sealing effect results from the fact that the silica sol and the sodium silicate are fed to the mixing water in a ratio of 1:1 to each other.

An improvement of the above-mentioned properties of the soft gel medium is achieved, in particular in that the curing agent, in particular hydrogen carbonate powder, is fed in a ratio of 0.5:1 to the silica sol or to the sodium silicate. The ratios given refer, in particular to mass designations of the components mentioned.

Depending on the local application site and the pH values in the soil, the injection silicate gel solution can be adjusted to a desired pH value. According to the invention, a particularly advantageous variant of the method is that the injection silicate gel solution is formed with a substantially neutral pH value between 6 and 10. These are the typical pH values found in soil layers and groundwater, so that the injection silicate gel solution has no or no excessive impact on the natural pH value range.

The invention is further explained below by reference to the only one attached drawing, in which:

The figure illustrates a schematic flow chart of a system and of the method according to the invention;

The functioning of a system according to the invention as well as the method according to the invention are explained below with reference to the appended drawing, which illustrates a schematic flow chart.

To produce the injection silicate gel solution, mixing water, which is preferably tap water or groundwater, is fed to a filtering device for water purification and pretreatment.

The filtering device may comprise at least one filter element with an ion exchange resin. The filter element may also be referred to as a resin filter. The mixing water pretreated in this way can be fed directly to a mixing unit or, preferably, to a storage tank for further processing at a later stage. Mechanical cleaning, for example by filtering off turbid matter, can also take place in the filtering device.

In a first mixing system, which is provided with mechanical stirring elements, powdered hydrogen carbonate, such as sodium hydrogen carbonate, can be added to a predetermined amount of pretreated mixing water, wherein a premixture is produced in the mixing system. This premixture can preferably be fed to a storage tank for further processing or directly to another injection and mixing system, in which liquid silica sol and liquid sodium silicate are added to complete the injection silicate solution. This can be effected in a second mixing unit or with the first mixing unit. Preferably, immediately after adding and mixing, the soft gel medium thus produced is fed to an injection device by means of which it is fed to an injection point into a soil to a desired soil layer in order to form a sealing blanket there.

The invention claimed is:

1. A system for producing an injection silicate gel solution for injection into a soil with
    a filtering device through which a mixing water can flow for pretreatment, wherein the filtering device has at least one filter element for ion exchange,
    an admixing device for metered admixing of a curing agent,
    a feeding device for feeding liquid silica sol into the pretreated mixing water,
    a feeding device for feeding liquid sodium silicate into the pretreated mixing water, and
    a mixing device for mixing and homogenizing the fed components with the pretreated mixing water for forming a silicate gel solution
wherein
    the filter element comprises an ion exchange resin, and
    the filtering device comprises at least one first filter element with a cation exchange resin and at least one second filter element with an anion exchange resin.

2. The system according to claim 1,
wherein
the system for producing an injection silicate gel solution is line-connectable to an injection device by means of which the produced injection silicate gel solution can be injected into the soil for forming a silicate gel blanket.

3. The system according to claim 1,
wherein
a plurality of first filter elements and a plurality of second filter elements are arranged alternately to one another in the direction of flow.

4. The system according to claim 1,
wherein
the filtering device comprises a backwashing device for regenerating the at least one filter element.

5. The system according to claim 1,
wherein
the injection device is arranged on or close to a drilling rig.

6. The system according to claim 1,
wherein the curing agent is a hydrogen carbonate powder.

7. A method for producing an injection silicate gel solution, with a system according to claim 1, wherein mixing water is passed through a filtering device having at least one filter element for ion exchange wherein the mixing water is pretreated, a curing agent is admixed to the pretreated mixing water, subsequently, liquid silica sol and liquid sodium silicate are fed to the pretreated mixing water, and the mixing water is mixed with the fed components and homogenized, wherein the injection silicate gel solution is formed, and wherein the filter element comprises an ion exchange resin.

8. The method according to claim 7,
wherein
the silica sol and the sodium silicate are fed into the mixing water in a ratio of 1:1 to each other.

9. The method according to claim 7,
wherein
the curing agent is fed into the silica sol or into the sodium silicate in a ratio of 0.5:1.

10. The method according to claim 7,
wherein
the injection silicate gel solution is formed with a substantially neutral pH value between 6 and 10.

11. The method according to claim 7,
wherein the curing agent is a hydrogen carbonate powder.

* * * * *